United States Patent
Corey et al.

(10) Patent No.: US 7,205,059 B2
(45) Date of Patent: Apr. 17, 2007

(54) METHODS AND APPARATUSES FOR MANAGING EFFLUENT PRODUCTS IN A FUEL CELL SYSTEM

(75) Inventors: John A. Corey, Melrose, NY (US); Gerhard Beckmann, Altamont, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 0 days.

(21) Appl. No.: 11/082,307

(22) Filed: Mar. 17, 2005

(65) Prior Publication Data

US 2005/0170227 A1    Aug. 4, 2005

Related U.S. Application Data

(63) Continuation of application No. 10/654,792, filed on Sep. 3, 2003, now Pat. No. 6,908,701, which is a continuation of application No. 09/818,290, filed on Mar. 27, 2001, now Pat. No. 6,632,553.

(51) Int. Cl.
| | |
|---|---|
| *H01M 8/00* | (2006.01) |
| *H01M 8/04* | (2006.01) |
| *H01M 8/10* | (2006.01) |
| *H01M 2/02* | (2006.01) |
| *H01M 2/14* | (2006.01) |

(52) U.S. Cl. .................... 429/13; 429/25; 429/30; 429/35; 429/38

(58) Field of Classification Search ............ 429/22, 429/34, 30, 38, 25, 13
See application file for complete search history.

(56) References Cited

U.S. PATENT DOCUMENTS 3,313,598 A  *  4/1967  Gluckstein .............. 423/657

(Continued)

FOREIGN PATENT DOCUMENTS

| EP | 0 907 979 B1 | 3/2000 |
|---|---|---|
| EP | 1 280 219 A2 | 1/2003 |

OTHER PUBLICATIONS

Moore, R.M., "Indirect-methanol and direct-mthanol fuel cell vehicles", Energy Conversion Engineering Conference and Exhibit Intersociety, Jul. 24-28, 2000, vol. 2, pp. 1306-1316.*

(Continued)

*Primary Examiner*—Patrick Joseph Ryan
*Assistant Examiner*—Thomas H. Parsons
(74) *Attorney, Agent, or Firm*—Cesari & McKenna, LLP

(57) ABSTRACT

A water management system for a fuel cell having an anode chamber including a fuel, a cathode chamber in fluid communication with an oxidizing agent, and a proton conducting membrane electrolyte separating the chambers. The system includes a gas plenum, a first valve for controlling a first flow of a gas from the anode chamber into the gas plenum, and a second valve for controlling a second flow of the gas collected by the gas plenum into the cathode chamber. The first valve is opened allowing the first flow while the second valve is closed between the gas plenum and the cathode chamber so that effluent gas is collected in the gas plenum. When the amount of the effluent gas in the gas plenum reaches a predetermined value, the first valve is closed and the second valve is opened to allow the second flow.

6 Claims, 7 Drawing Sheets

U.S. PATENT DOCUMENTS

| | | |
|---|---|---|
| 4,046,956 A | 9/1977 | Fanciullo |
| 4,132,695 A | 1/1979 | Burkholder |
| 4,420,544 A | 12/1983 | Lawson et al. ............. 204/284 |
| 4,478,917 A | 10/1984 | Fujita et al. |
| 4,537,840 A | 8/1985 | Tsukui et al. |
| 4,562,123 A | 12/1985 | Shimizu et al. |
| 4,593,534 A | 6/1986 | Bloomfield |
| 4,673,624 A | 6/1987 | Hockaday |
| 4,810,597 A | 3/1989 | Kumagai et al. |
| 4,828,941 A | 5/1989 | Sterzel |
| 4,931,168 A | 6/1990 | Watanabe et al. |
| 5,460,896 A | 10/1995 | Takada et al. |
| 5,523,177 A | 6/1996 | Kosek et al. |
| 5,573,866 A | 11/1996 | Van Dine et al. ............. 429/13 |
| 5,599,638 A | 2/1997 | Surampudi et al. ........... 429/33 |
| 5,629,104 A | 5/1997 | Crawford, Sr. et al. |
| 5,631,099 A | 5/1997 | Hockaday |
| 5,686,200 A | 11/1997 | Barton et al. |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. ........... 429/39 |
| 5,795,496 A | 8/1998 | Yen et al. ................. 252/62.2 |
| 5,795,668 A | 8/1998 | Banerjee |
| 5,916,699 A | 6/1999 | Thomas et al. |
| 5,925,476 A | 7/1999 | Kawatsu |
| 5,945,231 A | 8/1999 | Narayanan et al. ........... 429/30 |
| 5,992,008 A | 11/1999 | Kindler ....................... 29/730 |
| 6,096,448 A | 8/2000 | Wilkinson et al. ............. 429/13 |
| 6,124,054 A | 9/2000 | Gorman et al. ............... 429/34 |
| 6,130,175 A | 10/2000 | Rusch et al. |
| 6,146,781 A * | 11/2000 | Surampudi et al. ........... 429/35 |
| 6,162,554 A | 12/2000 | Nolscher et al. .............. 429/13 |
| 6,232,010 B1 | 5/2001 | Cisar et al. |
| 6,242,118 B1 | 6/2001 | Grasso et al. ................. 429/13 |
| 6,242,120 B1 | 6/2001 | Herron ........................ 429/22 |
| 6,248,469 B1 | 6/2001 | Formato et al. |
| 6,265,093 B1 | 7/2001 | Surampudi et al. |
| 6,294,277 B1 | 9/2001 | Ueno et al. ................... 429/22 |
| 6,296,964 B1 | 10/2001 | Ren et al. |
| 6,303,244 B1 | 10/2001 | Surampudi et al. |
| 6,322,917 B1 | 11/2001 | Acker |
| 6,350,540 B1 | 2/2002 | Sugita et al. |
| RE37,656 E | 4/2002 | Bahar et al. |
| 6,368,492 B1 | 4/2002 | Narayanan et al. ......... 205/638 |
| 6,387,559 B1 | 5/2002 | Koripella et al. ............. 429/34 |
| 6,406,805 B1 | 6/2002 | James et al. ................. 429/13 |
| 6,410,180 B1 | 6/2002 | Cisar et al. |
| 6,416,895 B1 | 7/2002 | Voss et al. .................... 429/20 |
| 6,420,059 B1 | 7/2002 | Surampudi et al. |
| 6,436,563 B1 | 8/2002 | Frank et al. .................. 429/17 |
| 6,447,943 B1 | 9/2002 | Peled et al. |
| 6,458,479 B1 | 10/2002 | Ren et al. |
| 6,460,733 B2 | 10/2002 | Acker et al. .................. 222/94 |
| 6,465,119 B1 | 10/2002 | Koripella et al. |
| 6,468,681 B1 | 10/2002 | Horiguchi et al. ............ 429/26 |
| 6,492,047 B1 | 12/2002 | Peled et al. |
| 6,497,975 B2 | 12/2002 | Bostaph et al. |
| 6,506,513 B1 | 1/2003 | Yonetsu et al. |
| 6,509,112 B1 | 1/2003 | Luft et al. |
| 6,566,003 B2 | 5/2003 | Acker |
| 6,645,655 B1 | 11/2003 | McNamee et al. |
| 6,808,838 B1 | 10/2004 | Wilson |
| 2001/0051293 A1 | 12/2001 | Narayanan et al. |
| 2002/0076599 A1 | 6/2002 | Neutzler et al. |
| 2002/0155341 A1 | 10/2002 | Finkelshtain et al. |
| 2002/0172851 A1 | 11/2002 | Corey et al. |
| 2002/0197522 A1 | 12/2002 | Lawrence et al. |
| 2003/0129464 A1 | 7/2003 | Becerra et al. |
| 2003/0157395 A1 | 8/2003 | Ren et al. |
| 2004/0209137 A1 | 10/2004 | Corey et al. |
| 2004/0265680 A1 | 12/2004 | Ren et al. |

OTHER PUBLICATIONS

"Fuel Cell", 1992 Fuel Cell Seminar, Program and Abstracts, pp. 233-236, 461-464.

"Miniaturized Fuel Cells for Portable Power", Helen L. Maynard and Jeremy P. Meyers, Lucent Technologies, 2000.

"Pocket-size PEMs", Paul Sharke, Mechanical Engineering.

"Polymer Electrolyte Fuel Cells as Potential Power Sources for Portable Electronic Devices", Shinshon Gottesfeld and Mahlon S. Wilson, pp. 486-517.

Ren, Xiaoming et al. Methanol Cross-Over in Direct Methanol Fuel Cells, Electronic and Electrochemical Materials and Devices, MST-11, MS-D429, Los Alamos National Laboratory, NM, all pages.

International Search Report for International Applicatin No. PCT/US03/04766, International Filing Date: Feb. 18, 2003, all pages.

Lubovskiy, V.V. et al., System for Monitoring and Regulating Fuel Concentration in an Anolyte, USSR Author's Certificate, SU 1,610,522 A1, International Classification 5 H 01 M 8/04, Application Date: Sep. 15, 1988, Published: Nov. 30, 1990, all pages.

A. Blum at al., "Water-neutral Mirco Direct Methanol Fuel Cell (DMFC) for Portable Applications," The Journal of Power Sources, vol. 117 (May 15, 2003), pp. 22-25.

* cited by examiner

METHODS AND APPARATUSES FOR MANAGING EFFLUENT PRODUCTS IN A FUEL CELL SYSTEM

This application is a continuation of U.S. patent application Ser. No. 10/654,792, filed on Sep. 3, 2003 now U.S. Pat. No. 6,908,701, which is a continuation of U.S. patent application Ser. No. 09/818,290, filed on Mar. 27, 2001, now issued as U.S. Pat. No. 6,632,553, both of which are presently incorporated herein by reference.

BACKGROUND OF THE INVENTION

1. Field of the Invention

The invention relates generally to fuel cell systems, and more particularly, the invention relates to methods and apparatuses for management of effluent products produced during an electrochemical reaction in a direct oxidation fuel cell system.

2. Background of the Invention

Fuel cells are devices in which an electrochemical reaction is used to generate electricity. A variety of materials may be suitable for use as a fuel depending upon the materials chosen for the components of the cell and the intended application for which the fuel cell will provide electric power.

Fuel cell systems may be divided into "reformer based" systems (which make up the majority of currently available fuel cells), in which fuel is processed to improve fuel cell system performance before it is introduced into the fuel cell, and "direct oxidation" systems in which the fuel is fed directly into the fuel cell without internal processing.

Because of their ability to provide sustained electrical energy, fuel cells have increasingly been considered as a power source for smaller devices including consumer electronics such as portable computers and mobile phones. Accordingly, designs for both reformer based and direct oxidation fuel cells have been investigated for use in portable electronic devices. Reformer based systems are not generally considered a viable power source for small devices due to size and technical complexity of present fuel reformers.

Thus, significant research has focused on designing direct oxidation fuel cell systems for small applications, and in particular, direct systems using carbonaceous fuels including methanol, butanol, propanol, and formaldehyde. One example of a direct oxidation fuel cell system is a direct methanol fuel cell system. A direct methanol fuel cell power system is advantageous for providing power for smaller applications since methanol has a high energy density (providing compact energy storage), can be stored and handled with relative ease, and because the reactions necessary to generate electricity occur under ambient conditions.

DMFC power systems are also particularly advantageous since they are environmentally friendly. The chemical reaction in a DMFC power system yields only carbon dioxide and water as by products (in addition to the electricity produced). Moreover, a constant supply of methanol and oxygen (preferably from ambient air) can continuously generate electrical energy to maintain a continuous, specific power output. Thus, portable computers, mobile phones and other portable devices can be powered for extended periods of time while substantially reducing and potentially eliminating at least some of the environmental hazards and costs associated with recycling and disposal of alkaline, Ni-MH and Li-Ion batteries.

The electrochemical reaction in a DMFC power system is a conversion of methanol and water to $CO_2$ and water. More specifically, in a DMFC, methanol in an aqueous solution is introduced to an anode chamber side of a protonically-conductive, electronically non-conductive membrane in the presence of a catalyst. When the fuel contacts the catalyst, hydrogen atoms from the fuel are separated from the other components of the fuel molecule. Upon closing of a circuit connecting a flow field plate of the anode chamber to a flow field plate of the cathode chamber through an external electrical load, the protons and electrons from the hydrogen atoms are separated, resulting in the protons passing through the membrane electrolyte and the electrons traveling through an external load. The protons and electrons then combine in the cathode chamber with oxygen producing water. Within the anode chamber, the carbon component of the fuel is converted by combination with water into $CO_2$, generating additional protons and electrons.

The specific electrochemical processes in a DMFC are:

| | |
|---|---|
| Anode Reaction: | $CH_3OH + H_2O = CO_2 + 6H^+ + 6e$ |
| Cathode Reaction: | $O_2 + 6H^+ + 4e = 2H_2O$ |
| Net Reaction: | $CH_3OH + 3/2O_2 = CO_2 + H_2O$ |

The methanol in a DMFC is preferably used in an aqueous solution to reduce the effect of "methanol crossover". Methanol crossover is a phenomenon whereby methanol molecules pass from the anode side of the membrane electrolyte, through the membrane electrolyte, to the cathode side without generating electricity. Heat is also generated when the "crossed over" methanol is oxidized in the cathode chamber. Methanol crossover occurs because present membrane electrolytes are permeable (to some degree) to methanol and water.

One of the problems with using DMFC power systems in portable power applications is the lack of a low-cost, effective method and system for removing effluents produced by the electrochemical reaction generally, and in particular, to remove water generated on the cathodic face of the membrane electrolyte or otherwise present in the cathode chamber. If water generated in the cathode chamber collects on the cathode of the membrane or in the anode chamber, it may prevent oxygen from coming into contact with the cathodic electrocatalyst, interrupting productive oxidation of the fuel and generation of electricity.

In addition, the proper ratio of fuel to water delivered to the anode chamber in DMFC power systems must be maintained. During operation, water molecules may be pulled across the membrane with hydrogen protons leading to excess water on the cathode side of the membrane and an increase in methanol concentration at the anode. The increased concentration of methanol may lead to additional methanol crossover resulting in decreased efficiency, a waste of methanol, and the generation of unwanted heat.

Theoretically, the effluents could be removed by venting the carbon dioxide out of the anode chamber and evaporating the water from the cathode side of the membrane electrolyte with a low humidity ambient airflow. However, under many relevant conditions (e.g., low volume air flow, low ambient air pressure, moderate to high humidity), the water cannot be effectively removed, and thus, alternate methods of eliminating water generated in the cathode are required.

According, the suitability of DMFC power systems for powering portable devices and consumer electronics is dependent upon the development of systems and methods for eliminating and/or recirculating the effluent products produced during operation of the fuel cell. In addition, in order for DMFC power systems to be used effectively, they must be self-regulating and passively generate electrical power under benign operating conditions, such as ambient air temperature and pressure.

SUMMARY OF THE INVENTION

Accordingly, the present invention provides a water management system and method for managing effluent products generated as a result of fuel oxidation in a fuel cell system. More particularly, the present invention provides a water management system and method using an effluent gas (carbon dioxide) generated as a by-product of said fuel oxidation to remove or recirculate water from the fuel cell system.

The water management system and method according to the present invention is particularly well suited for use with a direct oxidation fuel cell system. Carbon dioxide produced from the oxidation of fuel is not directly exhausted from the fuel cell system but instead, used to remove/recirculate effluent water.

The present invention also provides a system and method for recirculating effluent water in a fuel cell system to maintain a preferred concentration of the carbonaceous fuel, thereby reducing the amount of water that must be stored with the carbonaceous fuel to maintain an optimum fuel concentration.

Accordingly, the below recited aspects of the present invention are directed to direct oxidation fuel cell systems, and more preferably to direct methanol fuel cell power systems.

In one aspect of the present invention, an effluent gas produced in an anode chamber of a fuel cell is collected and then exhausted through a cathode chamber of the fuel cell when the amount of effluent gas reaches predetermined value.

In another aspect of the present invention, a fuel cell includes an anode chamber having a fuel, a cathode chamber in fluid communication with an oxidizing agent, a proton conducting membrane electrolyte separating the chambers, and a first valve for controlling a first flow of a gas from the anode chamber into the cathode chamber. A related method for reducing the amount of water in the cathode chamber includes closing the first valve allowing an effluent gas produced in the anode chamber to collect and opening the first valve when an amount of the effluent gas reaches a predetermined value.

In yet another aspect of the present invention, the fuel cell according to the second aspect further includes a gas plenum and a second valve. The first valve controls the first flow of the gas from the anode chamber into the gas plenum and the second valve controls a second flow of the gas collected in the gas plenum into the cathode chamber. A further related method includes opening the first valve allowing said first flow while said second valve is closed between said gas plenum and said cathode chamber. Effluent gas is then collected in the gas plenum via the first flow. When an amount of effluent gas collected in the gas plenum reaches a predetermined value, the first valve is closed and the second valve is opened, allowing the second flow.

In yet another aspect of the present invention, which may be used in conjunction with the above aspects, a fuel cell includes a fluid plenum, a third valve for controlling the second flow out of an outlet of the cathode chamber and into the fluid plenum and out an exhaust port and a fourth valve for controlling a third flow from the fluid plenum into the anode chamber.

The third valve of the fourth aspect allows the second flow between the outlet of the cathode chamber and the exhaust port when placed in a first position, and allows the second flow between the outlet and the fluid plenum when placed in a second position.

The fourth valve of the fourth aspect allows the third flow when placed in a first position and allows a fourth flow which controls a flow of fuel from a fuel supply cartridge to the anode chamber when placed in a second position.

In yet another aspect of the present invention, a fuel cell system includes an anode chamber having a fuel and a cathode chamber in fluid communication with an oxidizer. The cathode chamber includes an inlet positioned in a first end of the cathode chamber and an outlet positioned adjacent a second end of the cathode chamber. The fuel cell according to the fifth aspect further includes a proton conducting membrane electrolyte separating the chambers and having an effluent gas-permeable portion allowing effluent gas produced in said anode chamber to flow into the cathode chamber, and a nozzle having an inlet positioned adjacent the gas-permeable portion in the cathode chamber and an outlet positioned adjacent outlet of the cathode chamber.

In yet another aspect of the present invention, a method for removing water in a cathode chamber of a fuel cell, the fuel cell including an anode, a cathode chamber having an inlet and an outlet, and a membrane electrolyte having a gas-permeable portion, the method includes directing an effluent gas produced in the anode chamber from the gas-permeable portion into the cathode outlet at a pressure, establishing a low pressure region adjacent the outlet, and inducing a flow from the inlet through the cathode chamber and exiting the outlet.

The above aspect may further include equalizing the pressure to an ambient pressure adjacent the outlet of the cathode chamber.

The flows recited in the above aspects may be communicated through the various elements via conduits and/or channels.

In addition, above aspects may include a controller for actuating the valves for controlling the flows.

BRIEF DESCRIPTIONS OF THE DRAWINGS

For a better understanding of the invention, reference is made to the drawings which are incorporated herein by reference and in which.

DETAILED DESCRIPTION OF THE PREFERRED EMBODIMENTS

The term "low humidity gas" as used herein refers to ambient air or other gas containing substantially less than its saturation level of water vapor, that is, having a relative humidity of less than 100%.

Figure 1:
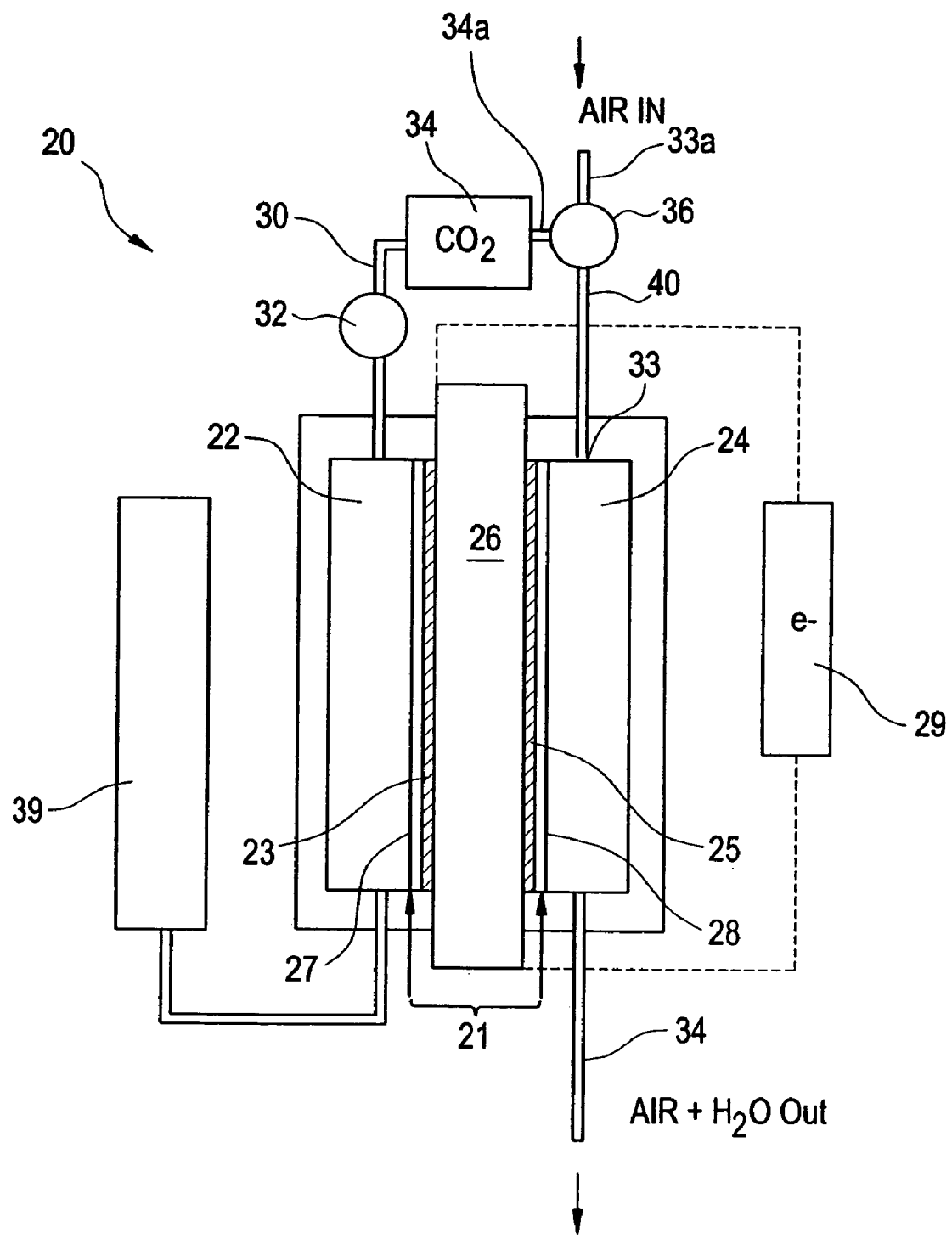
FIG. 1 is a schematic diagram of a water management system according to a first embodiment of the present invention.

As shown in FIG. 1, a direct oxidation fuel cell system 20 includes a membrane electrolyte assembly 21 having a proton-conducting, electronically non-conductive membrane electrolyte 26 disposed between an anode chamber 22 and a cathode chamber 24. The exact shape of the anode chamber and cathode chamber may be defined by a "flow field channel" which may be integrated into a flow field plate (not shown), which aids in distributing the fuel and the oxidizing agent to the membrane electrolyte. In this diagram, each surface of the membrane electrolyte 26 is coated with electrocatalysts which serve as anode reactive sites 23 on the anode chamber side of the membrane and cathode reactive sites 25 on the cathode chamber side of the membrane. The anode and cathode reactive sites facilitate the electrochemical reactions of the DMFC.

It is worth noting that the electrocatalysts may be provided in other areas within the anode and cathode chambers, and thus, the invention is not limited to fuel cells where the catalysts are provided on the membrane electrolyte.

Diffusion layers 27 and 28, may be included and positioned on either side of the membrane. These layers provide a uniform effective supply of methanol solution (diffusion layer 27) to the anode reactive sites and a uniform effective supply of oxidizing agent (diffusion layer 28) to the cathode reactive sites. Diffusion layers 27 and 28 on each of the anode and cathode sides of the membrane electrolyte also assist in providing optimal humidification of the membrane electrolyte by assisting in the distribution and removal of water to and from the membrane electrolyte at rates that maintain a proper water balance in the DMFC power system. Moreover, each layer may be used with a flow field (not shown), to further aid in distributing fuel and oxidizer to the respective reactive sites.

The form of the anode chamber may be defined by a flow field plate (not shown) which guides the fuel mixture over the anode diffusion layer and also functions as a conductor (i.e., acts as the electrical anode), and an exhaust vent 30 which allows carbon dioxide created during oxidation of the fuel to pass out of the anode chamber. Similarly, the cathode chamber may include a flow field plate (not shown) which guides oxidizing agent in the chamber and also functions as a conductor (i.e., acts as the electrical cathode), an inlet 33 and an exhaust outlet 34 which allows air to flow through the cathode chamber so that an adequate supply of oxygen is insured for the reaction. One skilled in the art will appreciate that air may flow from inlet 33 to outlet 34 and in the opposite direction, when the system is exposed to an ambient air pressure.

In a DMFC power system, an aqueous methanol solution, preferably a solution greater than 0% to about 100% methanol by volume, more preferably between greater than 0% to about 30% methanol by volume and most preferably approximately 3% methanol by volume, is used as the carbonaceous fuel reactant. The methanol solution circulates past the anode reactive sites 23. Upon the application of an electrical load between the flow field plates of the anode and the cathode chambers, the methanol solution disassociates, producing hydrogen protons and electrons, and generating carbon dioxide as a first by-product of fuel oxidation. Hydrogen protons migrate through the membrane electrolyte to the cathode chamber while electrons pass through the external load. The protons and electrons then combine with oxygen in the cathode chamber to form water, the second by-product of the reaction. The electrons are retrieved by the flow field plate of the anode chamber and carried through an external electrical load 29 to the flow field plate of the cathode chamber. Fuel supply cartridge 39 supplies fuel to the anode chamber 22.

First Embodiment

In a first embodiment of the present invention, the flow of carbon dioxide is controlled through selective positioning of a vent valve 32 and an air inlet valve 36. The vent valve 32 is a two-way valve incorporated in an exhaust vent conduit 30 for controlling venting and accumulation of carbon dioxide (in conjunction with the air inlet valve) into a gas plenum 34. The air inlet valve 36 is a three-way valve incorporated at the intersection of an air inlet conduit 33a and a gas plenum conduit 34a, for controlling the flow of air and carbon dioxide (in conjunction with the vent valve 32) into the cathode chamber.

The positioning of the vent valve and the air inlet valve determine whether the water management system operates in an air inlet mode or a flush mode. The air inlet mode allows air from the air inlet conduit 33a to flow into the cathode chamber and out of the exhaust outlet 34 carrying water away and refreshing the available oxygen for reaction at cathode reactive sites.

During the flush mode, a significant pressure drop caused by the buildup of carbon dioxide in the fluid plenum produces a high flow velocity of carbon dioxide from the gas plenum into the cathode chamber 24. This pressure drop also reduces the relative humidity of the carbon dioxide stored in the plenum, so that it can more readily absorb water in the cathode chamber. Thus, water is flushed from the cathode chamber by being blown out of the chamber by the pressure, and is evaporated due to the lowered relative humidity of the carbon dioxide.

Figure 2A:
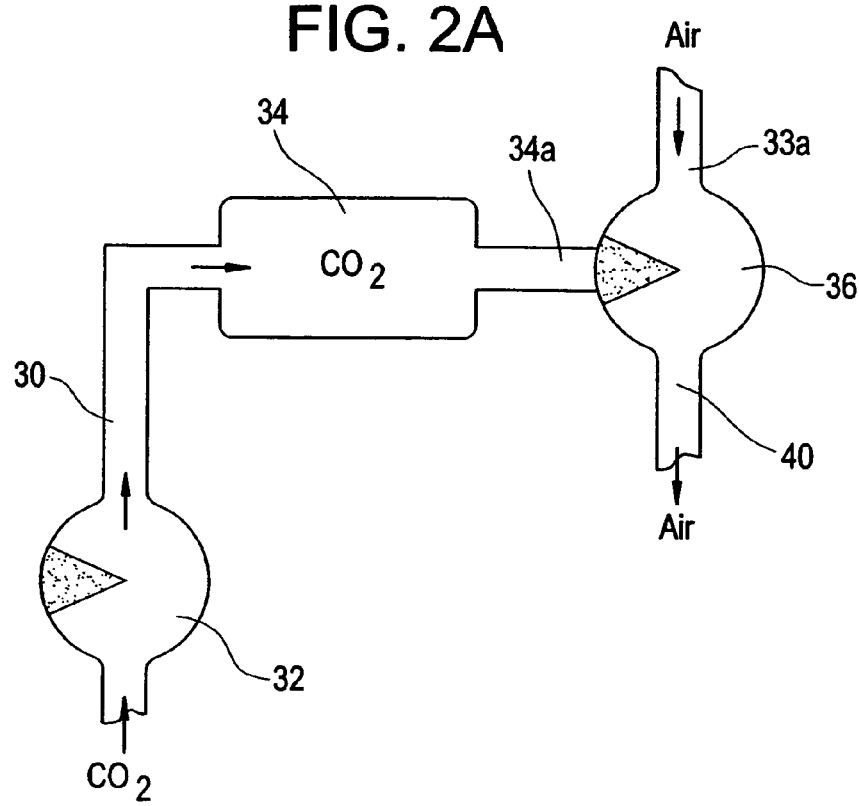
FIGS. 2A–2B are schematic diagrams of modes of gas flow into a direct oxidation fuel cell system according to the first embodiment for the present invention.

FIG. 2A illustrates the positions of vent valve 32 and the air inlet valve 36 during an air inlet mode. As shown, the vent valve 32 is open between the anode chamber 22 and the gas plenum 34 to allow carbon dioxide to accumulate in the gas plenum 34. The air inlet valve 36 is closed to the gas plenum 34 and open between an air inlet and the cathode chamber 24, so that the plenum can operate as a storage tank for the carbon dioxide and so that air may flow into the cathode chamber 24 as required for fuel oxidation.

Figure 2B:
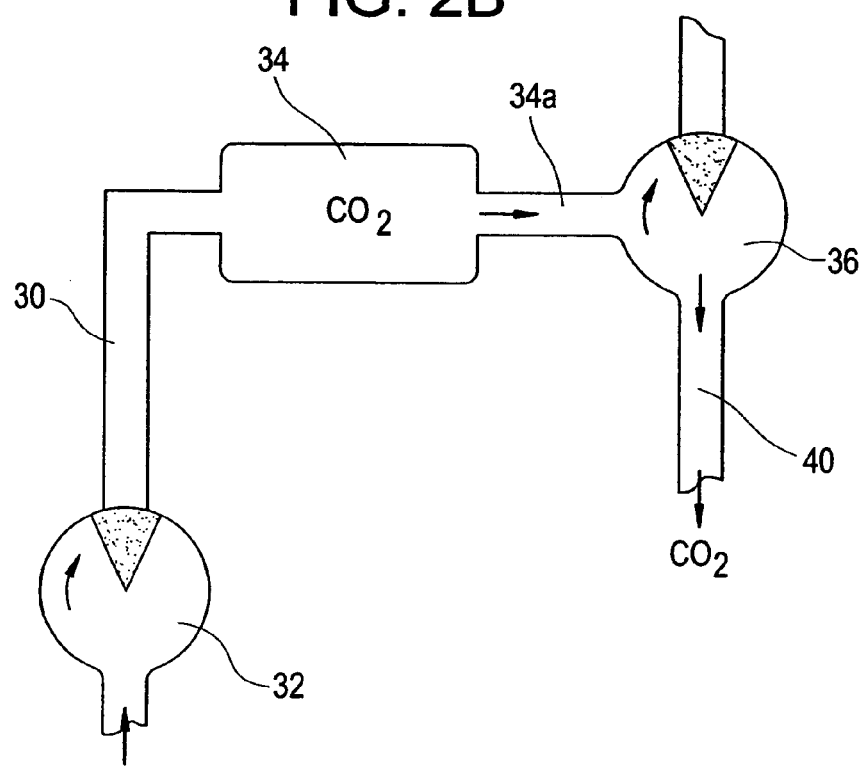

FIG. 2B illustrates the positions of the vent valve 32 and the air inlet valve 36 during a flush mode. In the flush mode, the vent valve 32 is closed between the anode chamber 22 and the gas plenum 34 and the air inlet valve 36 is open to the gas plenum 34 and closed between the air inlet and the cathode chamber. This positioning allows the stored carbon dioxide to flow out of the gas plenum and into the cathode chamber via conduit 40.

The vent valve 32 is preferably actuated to the flush mode position first, or concurrently with the air inlet valve 36. If the air inlet valve 36 is actuated before the vent valve, fuel may be expelled from the anode chamber into the cathode chamber adversely affecting the efficiency of the system as fuel is not used to generate power, but is wasted.

Because the membrane electrolyte operates more effectively within certain humidification parameters, the flush mode will not dehydrate or remove substantially all water from the membrane electrolyte.

In order for the flush mode to operate effectively, a predetermined sufficient amount of carbon dioxide is necessary to flush the water from the cathode reactive sites. Accordingly, the amount of carbon dioxide which has been generated must be determined.

In the present invention, the volume of carbon dioxide may be determined in the following ways:
(1) the level of fuel solution;
(2) the pressure level of the anode chamber;
(3) a time interval;
(4) power produced; and
(5) fuel concentration.

These methods and corresponding systems relate generally to active control of the flow of carbon dioxide to the cathode chamber. Such active control is generally managed by a controller (digital or analog) which actuates the valves for the various modes. However, it is worth noting that flow may also be controlled passively via relief valves, gas-permeable membranes, and other components that are well known to those skilled in the art.

Fuel Solution Level

As carbon dioxide is created and accumulates in the anode chamber and gas plenum, it pushes against the surface of the fuel solution. A predetermined displacement of carbonaceous fuel correlates to a predetermined volume of carbon dioxide sufficient to cause or assist in the removal of water from the cathode chamber. The system, however, is configured so that the predetermined displacement which determines when a flush mode is required still allows normal power generation. Thus, electricity production will not diminish as the predetermined level is reached.

Accordingly, when the predetermined displacement level is reached, a sensor sends a signal to a controller for actuating the valves to the flush mode positions.

The valves may be reset to air inlet mode by either the sensor, which indicates that the fuel is no longer displaced the predetermined amount, or by other means, including, but not limited to the use of a timer. The process is then repeated to continue generation of electricity.

Anode Chamber Pressure

A sufficient amount of carbon dioxide may be determined by detecting the level of pressure in at least one of the anode chamber 22 and the gas plenum 34. With this method and system, the pressure within the anode chamber is not fixed, rather it increases with the anodic oxidation of the fuel solution due to the generation of carbon dioxide within the anode chamber 24.

In the air inlet mode, the pressure of the anode chamber 22 typically varies in relation to the water generated in the cathode chamber 24. The amount of carbon dioxide in the closed volume of the anode chamber, is directly related to the amount of water generated in the cathode chamber. A predetermined level of pressure is associated with an amount of carbon dioxide suficient to remove said water from the cathode chamber.

When a pressure sensor (e.g., diaphragm type, or resistive bridge) within a wall of the anode chamber detects the predetermined pressure level, a controller actuates the valves to the flush mode positions. It is worth noting that this method and system may not require a controller. Specifically, the valves may be pressure-responsive release valves, actuated in response to a predetermined pressure level, or other fuel cell system operating characteristics.

Time Periods

Alternatively, the valves may be actuated between an air inlet mode and a flush mode positions after a predetermined period of time has elapsed during fuel cell operation. The controller tracks the amount of time when the cell is used for power. Since the power provided would be at a predetermined voltage/current, the amount of carbon dioxide produced per unit time can be determined. Thus, after a predetermined operation time period has elapsed, the controller will actuate the valves to flush mode positions.

Power Production

In a similar method and system, the carbon dioxide level may be determined by tracking how much electric energy has been produced by the cell. Accordingly, a predetermined amount of energy (power produced over a time interval) correlates with a certain amount of carbon dioxide generated. The controller tracks the amount of energy output and actuates the valves when the predetermined amount of energy has been produced.

Fuel Concentration

The fuel in the anode chamber is a mixture of carbonaceous fuel (i.e., methanol) and water. Unless otherwise compensated, as the oxidation process occurs, the fuel becomes less concentrated in the solution, i.e., less fuel, more water. Because the concentration of the carbonaceous fuel in the aqueous fuel solution and the amount of carbon dioxide generated are inversely related (provided that adjustments for introducing additional fuel are made), it is possible to determine how much carbon dioxide has been generated at the anode by measuring the concentration of the fuel in aqueous solution. Thus, a fuel concentration sensor (or sensors) sends fuel concentration signals to the controller. When the concentration reaches a predetermined minimum indicating that fuel has been consumed to generate a sufficient amount of carbon dioxide to remove water from the cathode chamber, the controller actuates the valves to the flush mode positions.

Second Embodiment

Figure 3:
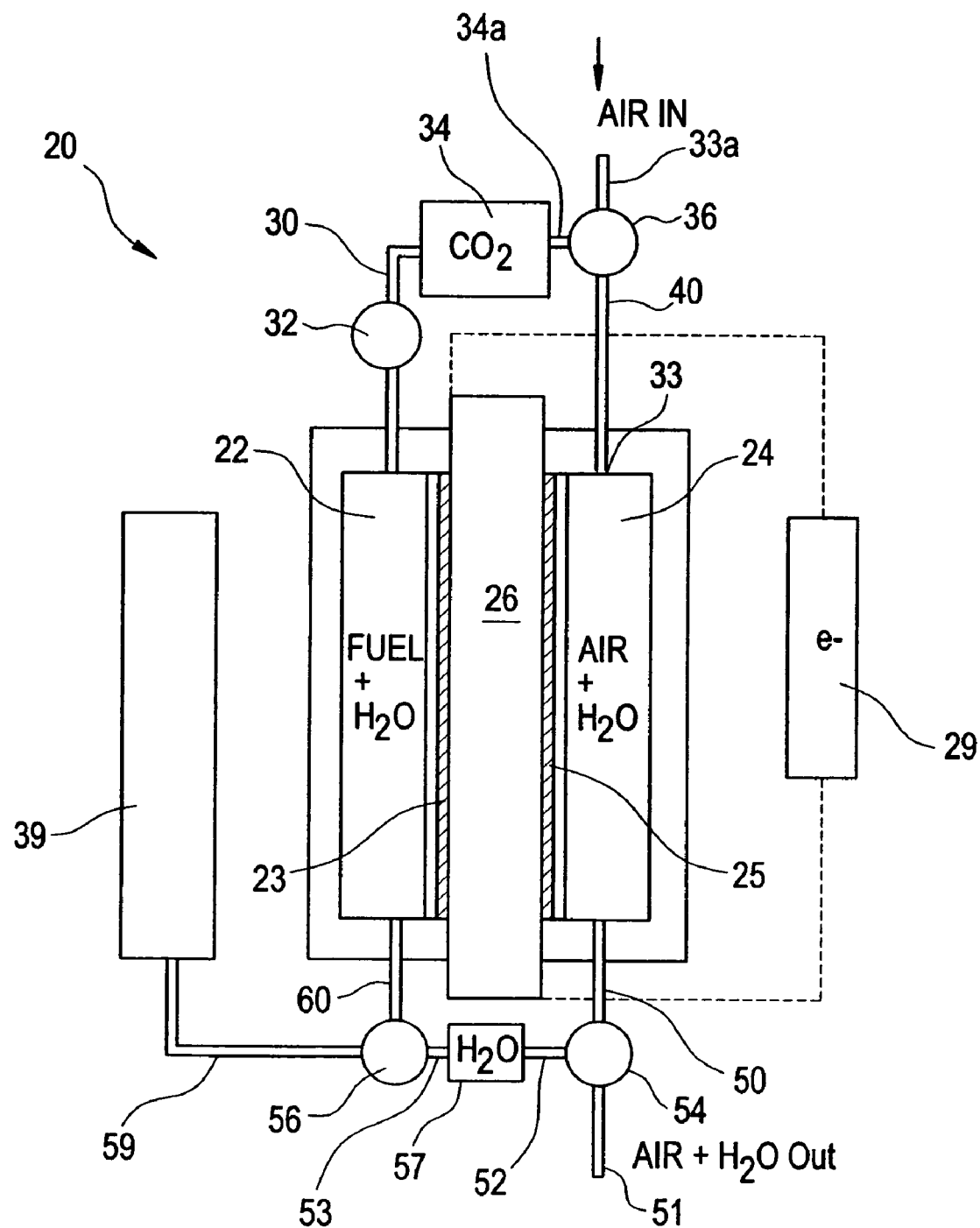
FIG. 3 is a schematic diagram of a water management system according to a second embodiment of the present the invention.
Figure 4A:
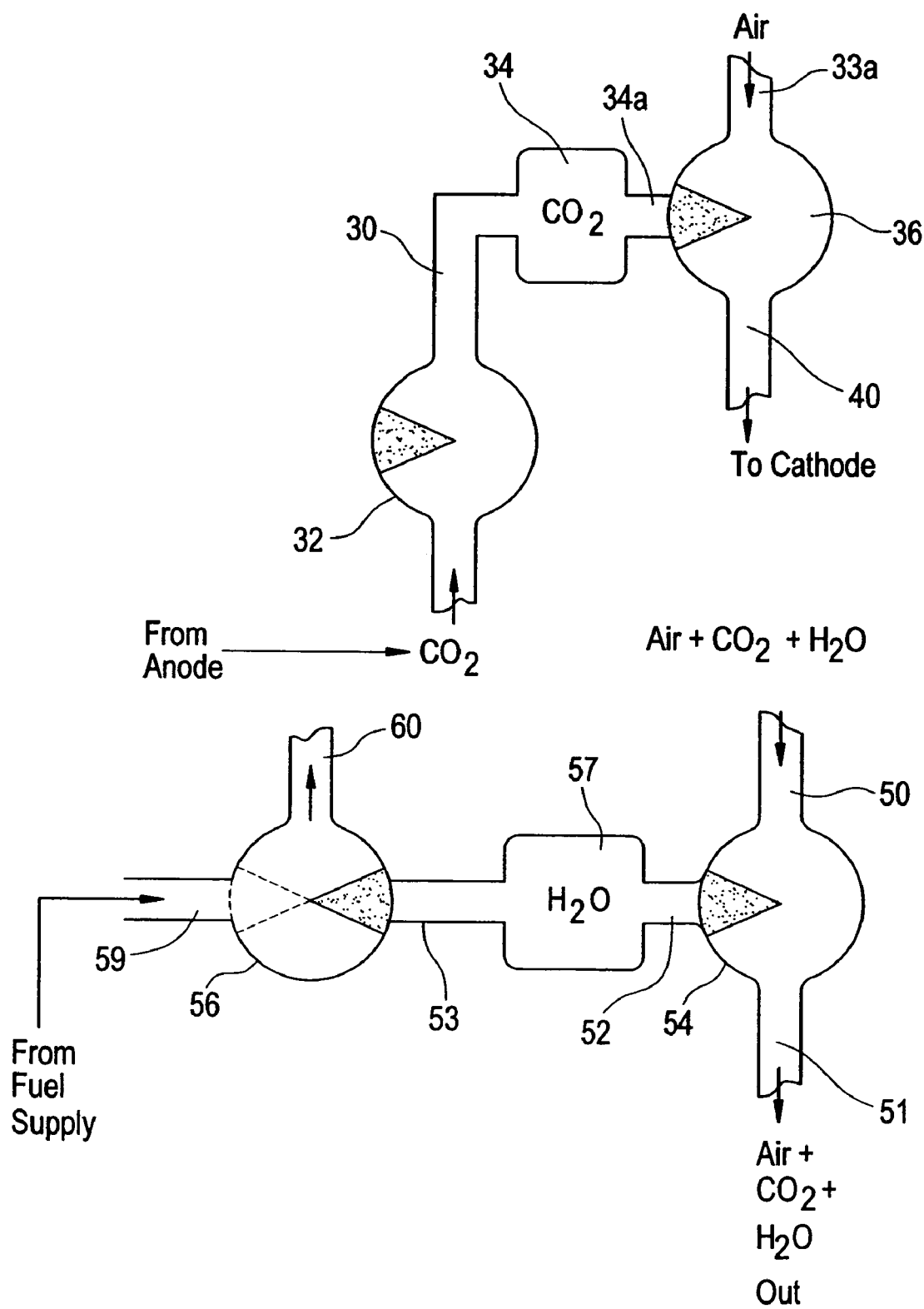
FIGS. 4A–4B are schematic diagrams of gas flow and water return into a direct oxidation fuel cell system according to the second embodiment of the present invention.
Figure 4B:
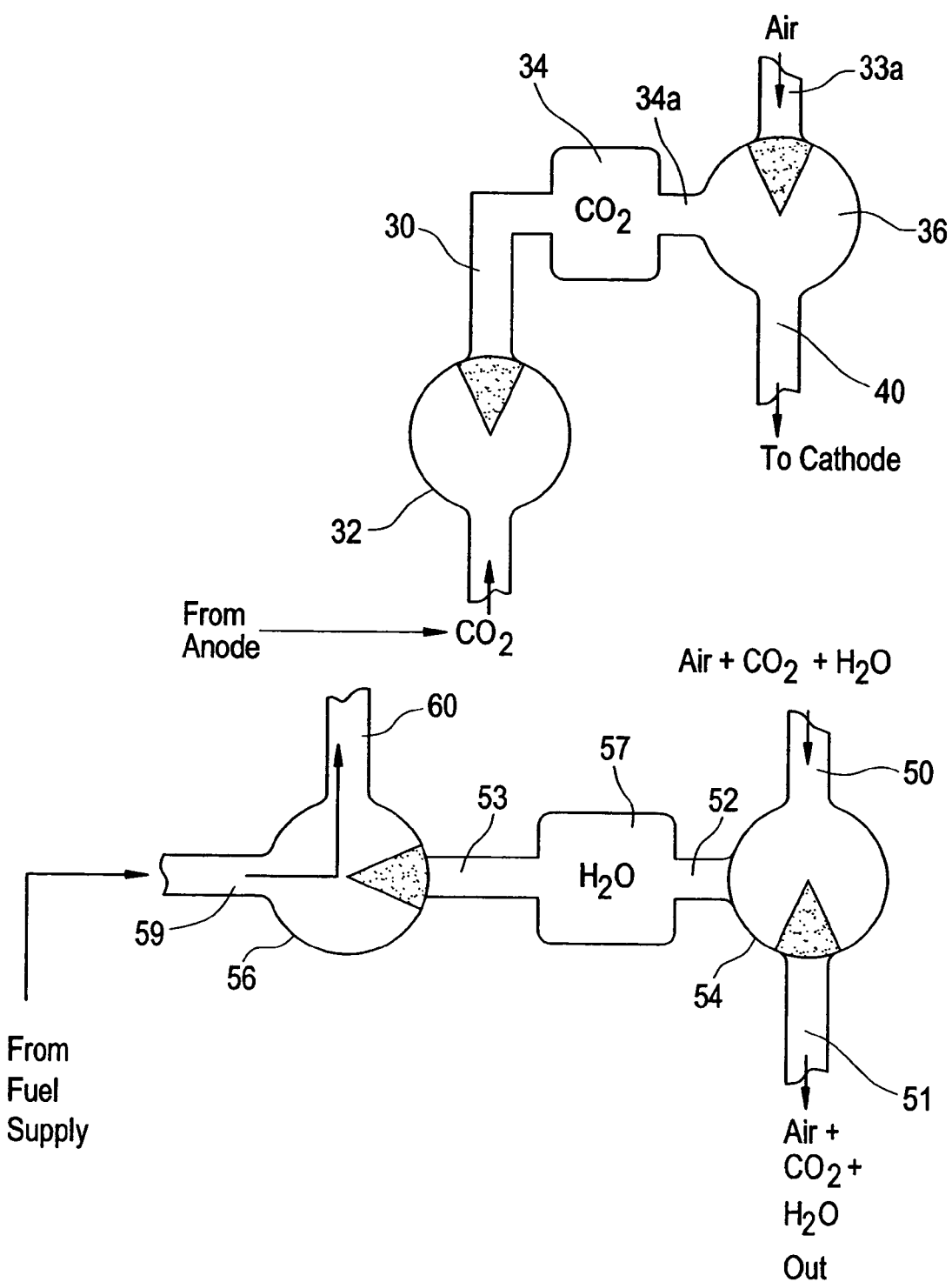

FIGS. 3 and 4A–4B illustrate a second embodiment according to the present invention. In this embodiment, a recirculation system provides active control for recirculating at least a portion of the water generated or transported across the membrane during fuel cell operation. By returning water to the anode chamber, fuel concentration is kept at an optimum level for efficient fuel cell operation, decreasing the volume of water that must be stored with the methanol in a fuel supply, thus allowing the DMFC power system to have an increased energy density. The recirculation system is preferably used in conjunction with the gas flow control methods and systems described in the previous embodiment.

The recirculation system includes a drain conduit 50 connected to the outlet of the cathode chamber, a drain valve 54, a drain outlet 51, a fluid plenum 57, a first fluid plenum conduit 52, a second plenum conduit 53, a return valve 56, a fuel supply conduit 59 and an anode supply conduit 60 connected to an inlet of the anode chamber.

The drain valve 54 is a three-way valve positioned at the intersection between the drain conduit 50, the drain outlet 51 and the first fluid plenum conduit 52, and is used either to exhaust water and gaseous effluent from the cathode chamber to the environment (connecting drain line 50 to the drain outlet 51), or to recirculate water removed from the cathode chamber to the cathode chamber (connecting drain line 50 to the first fluid plenum conduit 52).

The return valve 56 is also a three way valve positioned at the intersection of the second fluid plenum conduit 53, the anode inlet conduit 60 and the fuel supply conduit 59, and is used to keep a specific amount of fuel solution in the anode chamber (connecting the fuel supply conduit 59 to the anode supply conduit 60), and to recirculate the water recovered from the cathode chamber into the anode chamber (connecting second fluid plenum conduit 53 with the anode supply conduit 60). The valve 56 may also be used as a mixing chamber, for mixing fuel solution with recirculated water from the cathode chamber for supply to the anode chamber.

Depending upon the state of the system generally, and the distribution of water in the DMFC power system, valves 54 and 56 may be actuated sequentially or simultaneously. Preferably, valves 54 and 56 are used in conjunction with the previous embodiment, the drain valve 54 and the return valve 56 include corresponding positions for the air inlet mode and the flush mode, and thus may be actuated upon detection of the same process variables and/or physical conditions for vent valve 32 and air inlet valve 36. Alternatively, the drain valve 54 and the return valve 56 may be activated independently of carbon dioxide flow control process.

FIGS. 4A and 4B illustrate the positions of the drain valve 54 and return valve 56 during an air inlet mode (FIG. 4A) and a flush mode (FIG. 4B). As shown in FIG. 4A, during an air inlet mode, the drain valve 54 exhausts water and carbon dioxide to the environment and the return valve 56 is closed to the fluid plenum 57 and open between the fuel supply cartridge 39 and the anode chamber 22. This establishes a throughput between the fuel supply 39 and the anode chamber 22 to discharge pressurized fuel into the anode chamber 22. Alternatively, during the air inlet mode, the return valve 56 (as shown in phantom) may periodically close to the fuel supply 39 and open to the fluid plenum 57 establishing a throughput between the fluid plenum 57 and the anode chamber 22 to return water to the anode chamber 22 for adjustment of the concentration of methanol solution. The return valve may also be closed to the fuel supply to halt the admission of new fuel during periods of low or no power generation.

Upon detection of the sufficient volume of carbon dioxide for the flush mode (FIG. 4B), the drain valve 54 is actuated to open to the fluid plenum 57 establishing a throughput between the cathode chamber 24 and the fluid plenum 57. Because pressure of the anode chamber 22 is higher than ambient pressure of the cathode chamber 24 during the air inlet mode, upon actuation to the flush mode of gas flow control, the pressure of the anode chamber 22 drops substantially and equilibrates with the pressure of the cathode chamber 24. Water flushed from the cathode chamber 24 in the flush mode, therefore, is propelled by the flow of carbon dioxide, assisting in the collection of water in the fluid plenum 57.

Generally, since only a portion of water may be required for recirculation to the anode chamber, the drain valve 54 may remain open to the fluid plenum 57 for comparatively short intervals during the flush mode. Since the cathode and anode chambers, though connected together through valves 32 and 36, are together closed to the ambient by valves 36 and 54, some water pressure is maintained during recirculation of water from the cathode chamber 54 to the fluid plenum 57. Accordingly, if the drain valve 54 is closed to the plenum 57 (i.e., allowing fluid communication between drain conduit 50 and the drain outlet 51), the water within the fluid plenum can be discharged into the anode chamber upon opening of the return valve 56 between the second fluid plenum conduit and the anode supply conduit. It should be understood that additional valve(s) or plenum(s) (not shown) between return valve 56 and anode chamber 22 may be used to control the flow of recirculated water and or fuel into anode chamber.

Figure 4C:
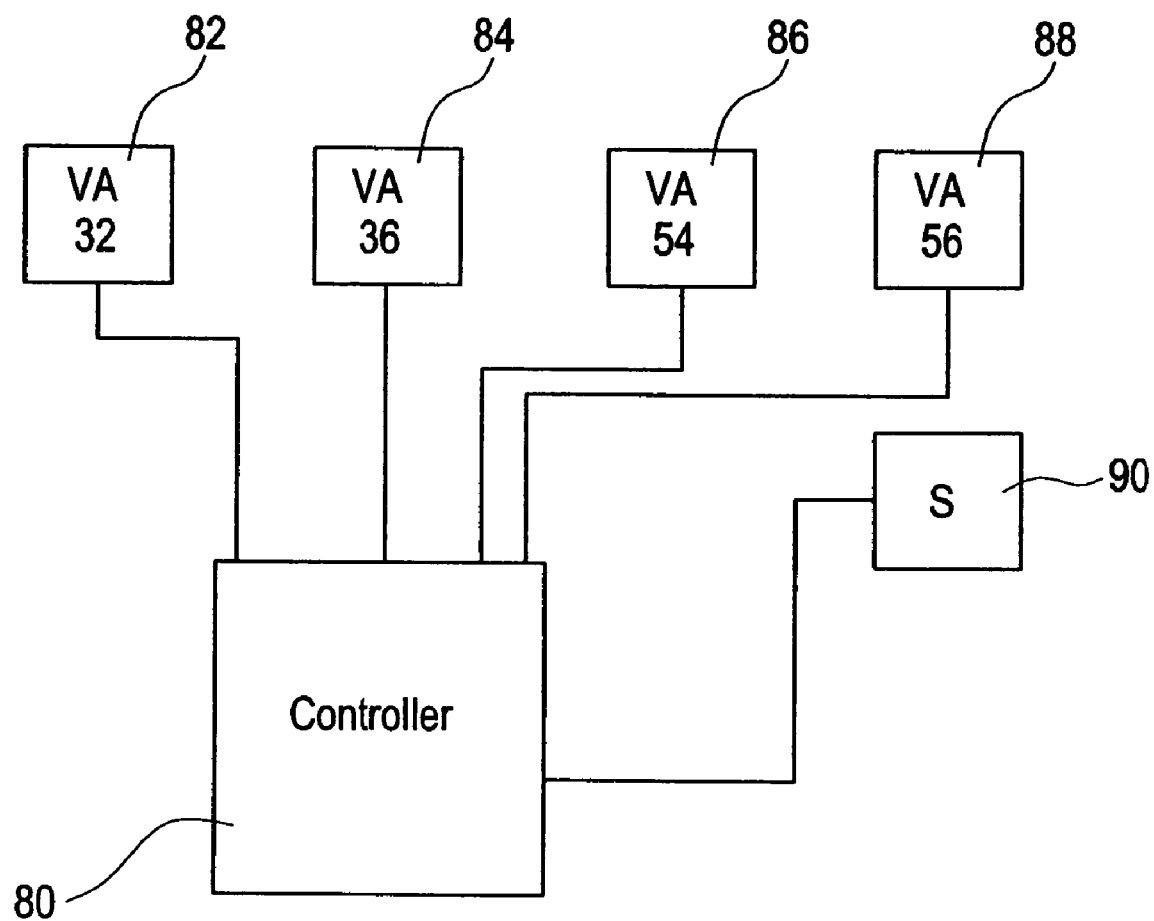
FIG. 4C is a schematic diagram of a controller system for the water management system for the embodiments of the present invention.

FIG. 4C illustrates a generic controller for actuating the valves in both the first and second embodiments (independently and in conjunction). Accordingly, a controller 80, receiving signals from sensor 90 (i.e., carbon dioxide levels) sends signals to valve actuators 82, 84, 86 and 88 at the appropriate times for the air inlet mode, the flush mode, fuel supply and water recirculation.

Third Embodiment

Figure 5:
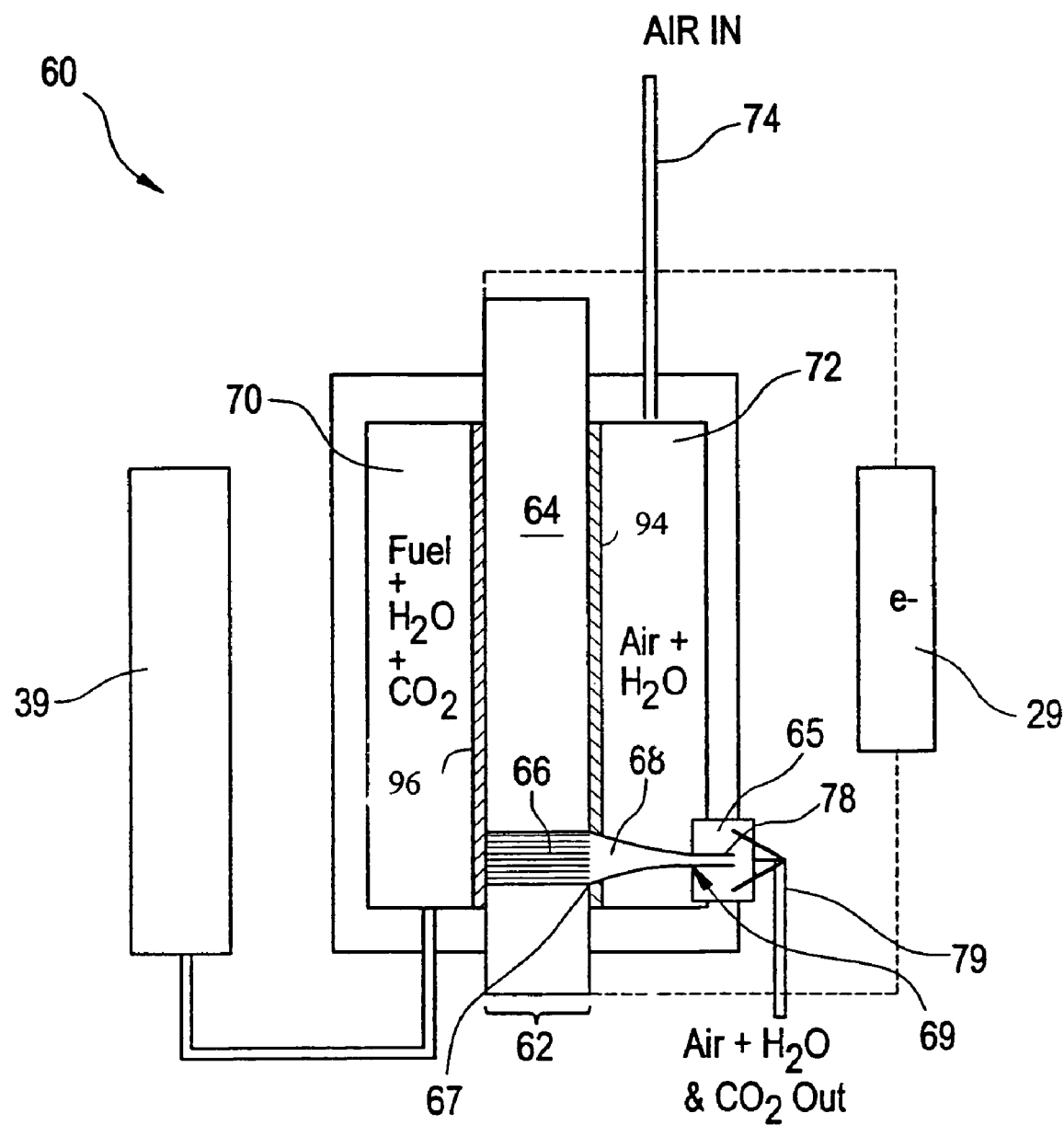
FIG. 5 is a schematic diagram of a water management system according to a third embodiment of the present invention.

FIG. 5 illustrates a third embodiment according to the present invention. In this embodiment a passive control system using a low humidity gas produced in the anode chamber removes water from the reactive sites 94 in the cathode chamber using an enhanced air flow system.

The system according to this embodiment includes a membrane electrolyte assembly 62 disposed between an anode chamber 70 and a cathode chamber 72 of a fuel cell system 60. The assembly 62 includes a proton-conducting, electronically non-conductive membrane electrolyte 64 having a gas-permeable sector 66 selectively permeable to a desired effluent gas, such as carbon dioxide, but not to water or fuel. A gas ejector 68 is connected to the cathode side of the gas-permeable sector 66.

The gas ejector 68 having a first end 67 and a second end 69, may be constructed preferably in a conical, parabolic or exponential shape. Each of these shapes causes the acceleration of the flow velocity of carbon dioxide as it travels from the first end to the second end. To attain such a flow profile, the broadest portion of each shape is positioned on the first end, with the narrowest portion positioned at the second end.

The gas ejector 68 further includes a collar 65 disposed at the second end 69 of the gas ejector, and is preferably positioned to encompass a low pressure region 78 at the exit of the gas ejector, created by the flow of gas through the ejector. As air flows toward the low pressure region 78, the air flow is entrained in the low pressure region 78. The collar 65 then carries the entrained air, together with any water flushed from the cathode chamber and other effluents, toward an outlet 79.

Accordingly, the system operated in the following manner. Air, supplied to the cathode chamber 72 from an external source, is delivered by an air inlet 74 to the cathode chamber. The low pressure region located at the second end 69 of the gas ejector draws air from the air inlet 74 toward the low pressure region. Air thereby is forced to flow into and through the cathode chamber 72 at an enhanced velocity such that excess water accumulating in the cathode chamber, especially at the cathode reactive sites 96, is flushed or evaporated out of the chamber.

Having thus presented the present invention in view of the above described embodiments, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A direct oxidation fuel cell system, comprising:
   (A) a providing a direct oxidation fuel cell including a catalyzed membrane electrolyte, having an anode aspect and a cathode aspect wherein said anode aspect has no liquid exit port;
   (B) a fuel source for providing fuel to said anode aspect, wherein said fuel comprises essentially methanol; and
   (C) a load coupled across said fuel cell, providing a path for electrons produced in electricity-generated reactions of said fuel cell.

2. A direct oxidation fuel cell system, comprising:
   (A) a providing a direct oxidation fuel cell including a catalyzed membrane electrolyte, having an anode aspect and a cathode aspect, and wherein said anode aspect has no liquid exit port;
   (B) a fuel source for providing fuel to said anode aspect, wherein said fuel consists essentially of methanol; and
   (C) a load coupled across said fuel cell, providing a path for electrons produced in electricity-producing reactions of said fuel cell.

3. A method of delivering fuel to a direct oxidation fuel cell, including the steps of:
   (A) providing a direct oxidation fuel cell including a catalyzed membrane electrolyte, having an anode aspect and a cathode aspect;
   (B) providing a fuel to said anode aspect of said catalyzed membrane electrolyte, said fuel comprising methanol to about 100% by volume;
   (C) collecting an effluent gas produced in an anode chamber of the fuel cell and exhausting the collected gas through a cathode chamber to an ambient environment.

4. A method of delivering fuel to a direct oxidation fuel cell, including the steps of:
   (A) providing a direct oxidation fuel cell including a catalyzed membrane electrolyte, having an anode aspect and a cathode aspect;
   (B) providing a fuel to said anode aspect of said catalyzed membrane electrolyte, said fuel comprising methanol to about 100% by volume;
   (C) delivering fuel by a direct fuel feed into said anode chamber without anode recirculation.

5. A method of delivering fuel to a direct oxidation fuel cell, including the steps of:
   (A) providing a direct oxidation fuel cell including a catalyzed membrane electrolyte, having an anode aspect and a cathode aspect, and at least a portion of one wall of said anode chamber is gas permeable and liquid impermeable; and
   (B) providing a fuel to said anode aspect of said catalyzed membrane electrolyte, said fuel comprising methanol to about 100% by volume.

6. A method of delivering fuel to a direct oxidation fuel cell, including the steps of:
   (A) providing a direct oxidation fuel cell including a valve for controlling a flow of a gas from an anode chamber to a cathode chamber and a catalyzed membrane electrolyte, having an anode aspect and a cathode aspect; and
   (B) providing a fuel to said anode aspect of said catalyzed membrane electrolyte, said fuel comprising methanol to about 100% by volume.

* * * * *